(12) United States Patent
Sathyanarayana et al.

(10) Patent No.: US 7,680,925 B2
(45) Date of Patent: Mar. 16, 2010

(54) METHOD AND SYSTEM FOR TESTING PROVISIONED SERVICES IN A NETWORK

(75) Inventors: Krishna Sathyanarayana, Bangalore (IN); Preetham Kajekar, Bangalore (IN); Guruprasad Ramarao, Bangalore (IN); Vikas Sharma, Sikar (IN); Varukuti Venugopal Reddy, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 927 days.

(21) Appl. No.: 11/338,203

(22) Filed: Jan. 24, 2006

(65) Prior Publication Data

US 2007/0171834 A1  Jul. 26, 2007

(51) Int. Cl.
*G06F 15/173* (2006.01)

(52) U.S. Cl. ........................ 709/224; 709/223

(58) Field of Classification Search .......... 709/223, 709/224; 370/241, 242; 702/122
See application file for complete search history.

(56) References Cited

U.S. PATENT DOCUMENTS 7,269,629 B2 * 9/2007 Zmudzinski et al. ........ 709/207

| | | | |
|---|---|---|---|
| 7,315,807 B1 * | 1/2008 | Lavallee et al. | 703/21 |
| 2002/0124110 A1 * | 9/2002 | Tanaka | 709/246 |
| 2002/0138614 A1 * | 9/2002 | Hall | 709/225 |
| 2002/0156888 A1 * | 10/2002 | Lee et al. | 709/224 |
| 2003/0093256 A1 * | 5/2003 | Cavanagh et al. | 703/14 |
| 2004/0015579 A1 * | 1/2004 | Cooper et al. | 709/223 |

OTHER PUBLICATIONS

Sethaput, V. Thorley, K. Zhou, L. Voldmane, B. Onart, A. Travostino, F., A framework for automated unit testing of live network clouds, Integrated Network Management Proceedings, 2001 IEEE/IFIP International Symposium on, Publication Date: May 14-18, 2001, On pp. 579 - 592, Seattle, WA.

* cited by examiner

*Primary Examiner*—John Follansbee
*Assistant Examiner*—Madhu Khanna
(74) *Attorney, Agent, or Firm*—Trellis IP Law Group, PC

(57) ABSTRACT

A method, system, and apparatus are provided for testing a service in a network. A simulated interface is created on a network device by a Network Management Station (NMS). Thereafter, an instruction is received at the simulated interface from the NMS. The instruction comprises a source address, a destination address and other information to test a service. The service is tested on the network device based on the received instruction. A response is generated from the test. The response indicates whether the service is working as intended between the source address and the destination address. The response is sent from the simulated interface to the NMS.

17 Claims, 5 Drawing Sheets

METHOD AND SYSTEM FOR TESTING PROVISIONED SERVICES IN A NETWORK

BACKGROUND OF THE INVENTION

1. Field of Invention

Embodiments of the invention relate to network management in general. More specifically, the embodiments of the invention relate to testing provisioned services in a network.

2. Description of the Background Art

Various provisioned services (hereinafter referred to as services) are available to users across networks. Examples of the services include Virtual Private Networks (VPN), firewalls and Network Admission and Control (NAC). A VPN is a network used for secure communication over a public network. A firewall is a combination of software and hardware, which prevents the exchange or transfer of data that is forbidden by a security policy. Network Admission and Control is a set of technologies used to enforce security policy compliance on all network devices.

Network devices may be data processing units, hosts, servers, routers, switches, hubs, gateways, wireless access devices, mobile or telecommunication devices, and so forth. A service is tested on a network device by checking if the configuration commands entered for the service are working as intended. According to a conventional method of testing the VPN and the firewall, an extended ping command is sent to the network device. In the extended ping command, the network device's IP address is sent along with a generated packet. However, this method of testing may not be of use when 'interesting traffic' and the network device are in different subnets. Interesting traffic in a network refers to those data packets that can be received at the network device.

In the absence of a direct testing facility, a lot of time and effort is spent to ensure desired performance of the service in the network. Further, it is difficult to test all the services for their working if changes are made only in any one of them. For example, a change may be in the form of a newly added firewall rule. In this case, it is very difficult to test if the firewall rule is working as expected or whether it is interfering with the previously existing rules.

According to another conventional method for testing a service, traffic generators that inject data packets into the network may be inserted at various places in the network. The testing comprises analyzing the response of network devices configured for the service to these data packets. Real devices or personal computers (PCs) may also be used for verifying if a service is working as intended. However, this method is not scalable to a medium-sized network, as the traffic generators need to be installed at a number of places in the network. Moreover, PCs are required to generate the real packets for testing.

DETAILED DESCRIPTION OF EMBODIMENTS OF THE INVENTION

Embodiments of the present invention provide a method and a system for testing provisioned services in a network. Network devices are tested to check whether configuration commands entered for the provisioned services are working as intended without having testing gears at remote facilities. In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Embodiments of the invention provide a mechanism to inject data packets on a network device. The data packets have arbitrary source and destination addresses and serve as a tool for testing network configuration for a service. A simulated interface is created on a network device by a Network Management Station (NMS). An instruction to initiate a test is sent from the NMS to the simulated interface. The instruction is in Extensible Markup Language (XML) format. The instruction contains data content, a source address, a destination address and an ingress interface of a data packet. Based on the instruction, the simulated interface creates the data packet, if the ingress interface of the data packet is allowed for the source and destination. Routing and forwarding tables of the network device are modified such that a response for the created data packet is received at the simulated interface. The data packet is then injected into the network device for further processing. A response to the injected data packet is generated that indicates whether the service is working as intended. The response is received at the simulated interface and converted to XML. Thereafter, the simulated interface sends the XML response to the NMS. The NMS analyzes the XML response to decide if the service is working as intended.

Figure 1:
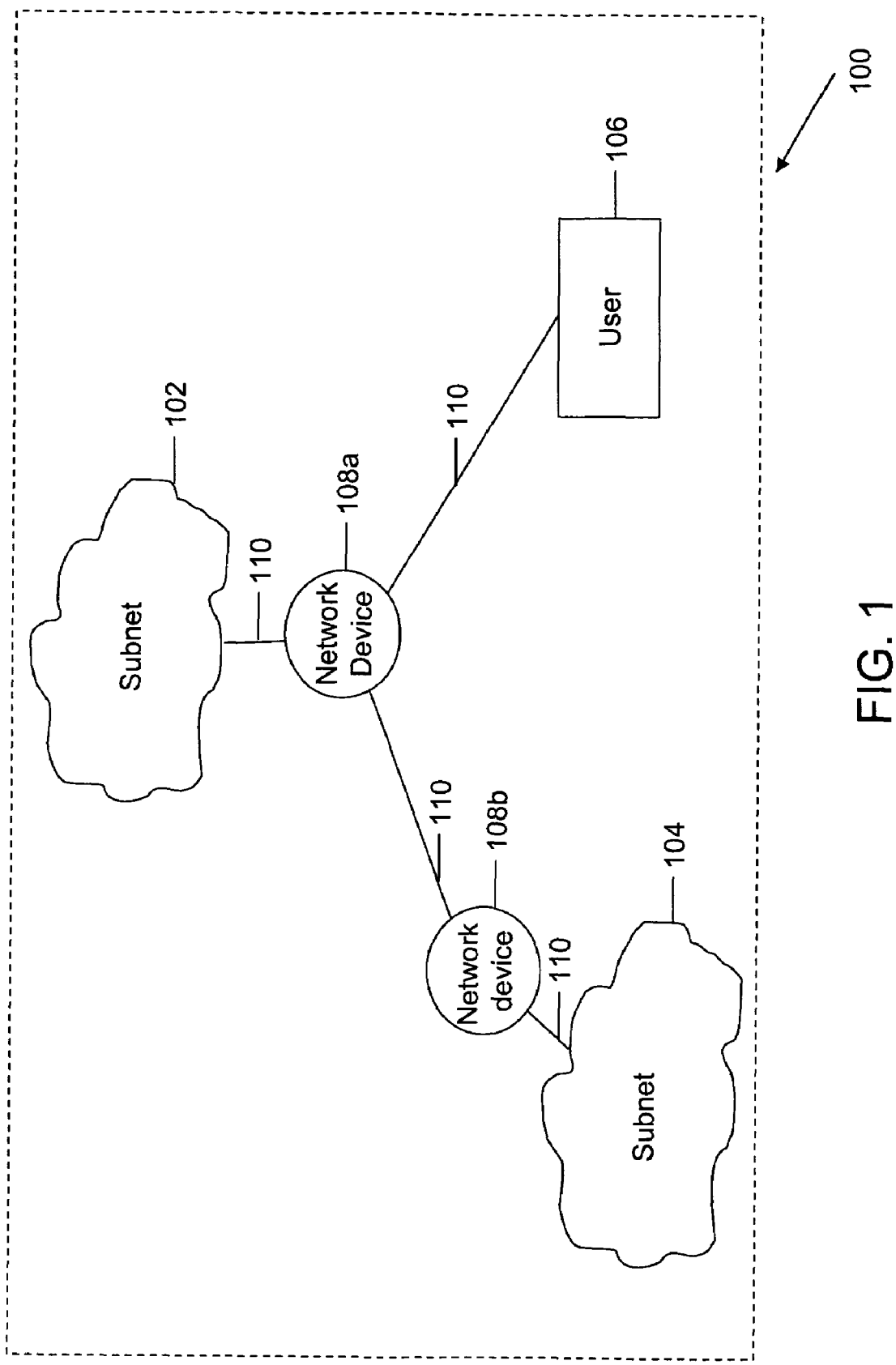
FIG. 1 illustrates an environment for implementing an exemplary embodiment of the present invention.

Referring now to the drawings more particularly by reference numbers, a simplified embodiment illustrates an environment for implementing an exemplary embodiment of the present invention in FIG. 1, where network 100 includes subnet 102 connected to subnet 104 through network device 108a and network device 108b. Subnet 102 is also connected to user 106 through network device 108a. Network medium 110 is a means of connecting subnets 102 and 104 and user 106. Subnets 102 and 104 may be Local Area Networks (LAN), Wide Area Networks (WAN), Ethernet or a combination of two or more of these network types. Subnets 102 and 104 comprise a Network Management Station (NMS) and a plurality of network devices that are connected to each other and to the NMS. Network devices 108a and 108b are network infrastructure devices such as hubs, switches, routers, gateways and wireless access devices that connect the network devices in a subnet or across subnets. Network medium 110 may be a physical medium such as cable or fiber optics, connecting network devices within a subnet. In addition, network medium 110 may be leased lines such as ISDN and Optical Carrier-3 (OC3). Network medium 110 may also be a satellite medium connecting subnets that are geographically spaced apart.

Network 100 can be illustrated with an example of a secure network, where subnet 102 in an office of a company is connected to subnet 104 in a remote office and to user 106. The office may further be connected to more subnets such as a subnet of a business partner, other remote users at home or office, either employees or clients. One skilled in the art will appreciate that although only two subnets 102 and 104 and one user 106 are illustrated in FIG. 1, network 100 may comprise more subnets and users.

Provisioned services (hereinafter referred to as services) such as Virtual Private Network (VPN), firewalls and Network Admission and Control (NAC) operate within network 100 to achieve security of data and resources. A VPN is a network used for secure communication over a public network. The VPN may exist within an organization or distributed among a number of organizations. Individuals located at remote positions may also use the VPN. A firewall is a combination of software and hardware, which prevents the exchange or transfer of data that is forbidden by a security policy. Network Admission and Control is a set of technologies used to enforce compliance of the security policies on all network devices in a subnet.

A network administrator configures a service or a service rule in network 100. The configuration is carried out by entering a set of commands, called configuration commands, through a Network Management Station (NMS) or by directly entering the commands on the network devices. Testing the service or the service rule comprises testing whether the configuration commands entered for the service are working as intended.

Figure 2:
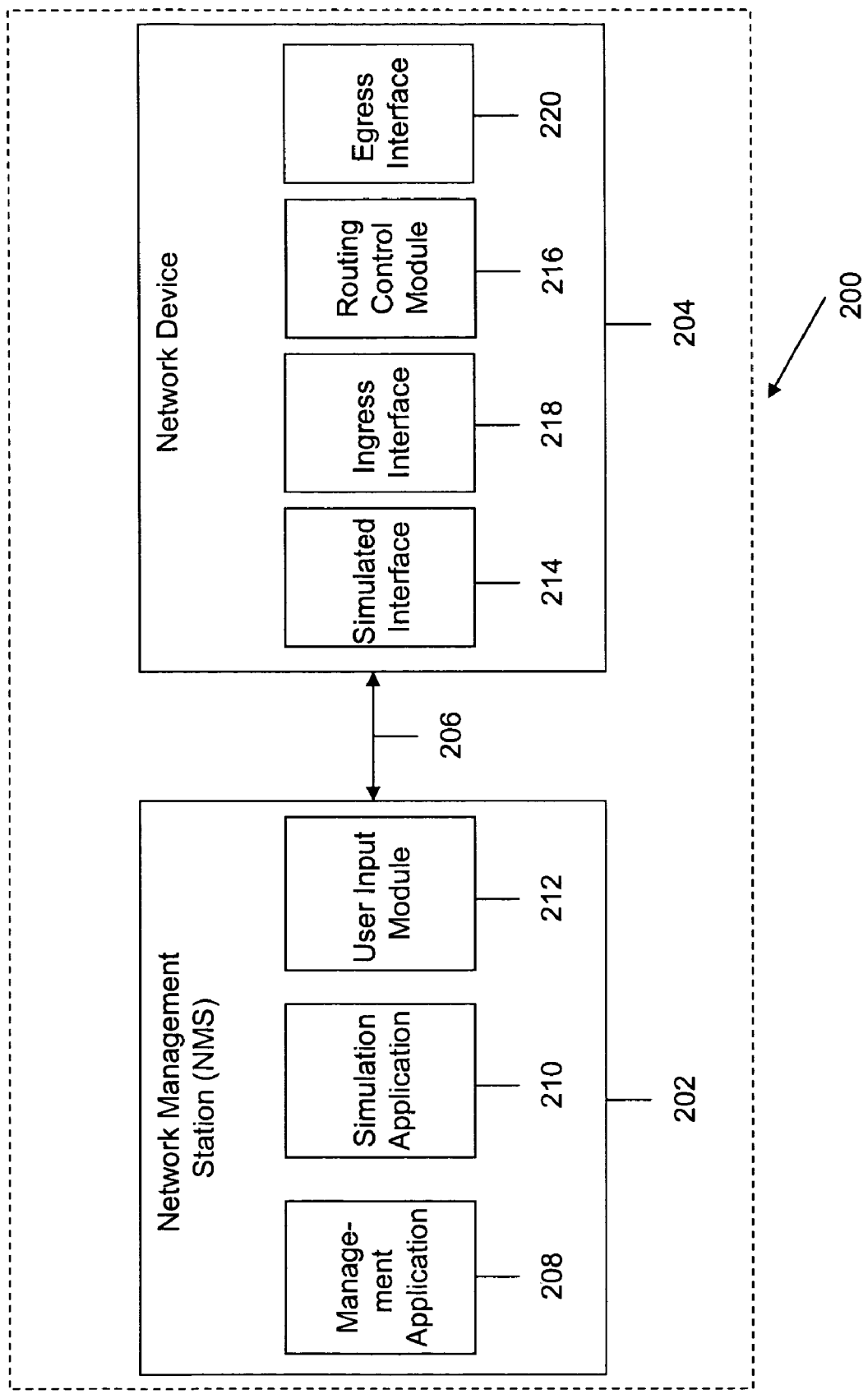
FIG. 2 illustrates a network system for testing a service in a network, in accordance with an exemplary embodiment of the invention.

FIG. 2 illustrates a network system 200 for testing a service in a network, in accordance with an exemplary embodiment of the invention. Network system 200 comprises a Network Management Station (NMS) 202, network device 204 and communication protocol 206. NMS 202 comprises management application 208, simulation application 210 and user input module 212. Network device 204 comprises simulated interface 214, routing control module 216, ingress interface 218 and egress interface 220. An NMS can include any one or more network components, devices, processors, processes or portions thereof. For example, in other embodiments items can be taken from, or added to, the specific type of NMS described in FIG. 2. Various types and numbers of applications, protocols, devices, or other items can be used to achieve the NMS functionality described herein.

Management application 208 is an application that can be used for managing network devices. Management application 208 performs the function of sending an instruction to network device 204 to initiate a test. Further, management application 208 receives a response generated from the test. In addition, management application 208 analyzes response generated from the test, and presents the response to the network administrator. Security Device Manager (SDM) is one such web-based management application for managing routers that functions as a graphical user interface. The SDM is used for configuring and monitoring Quality of Service (QoS) functions within routers and providing integrated management of Internet Operating System (IOS) features like wide area network (WAN) access, dynamic routing, IP Security, VPN, firewalls, and intrusion prevention.

Simulation application 210 creates a simulated interface 214 on network device 204 upon receiving a test initiation instruction from the network administrator. Simulated interface 214 is an intelligent code for simulating the test on network device 204. User input module 212 accepts input from the network administrator. User input module 212 may be a text user interface or a graphical user interface. The input comprises information related to one or more data packets or information sufficient to create the one or more data packets and an instruction to initiate the test. The data packets may be IP packets. The information related to the data packets comprises basic information required to create a data packet for injection. The information comprises data packet payload information, IP addresses, ingress interface for the data packets and the like. Data packet payload information is the data content that the data packet is supposed to contain. IP addresses are the IP addresses of the source and destination used for a data packet to be injected into network device 204. Ingress interface is the communication link at network device 204 from where a data packet enters network device 204. For example, an input interface port of a router is an ingress interface for the router. User input module 212 also accepts information related to the data packets in captured format such as packet capture (pcap) format. The packet capture format allows data packets traversing in a network to be captured, copied, displayed, interpreted and stored in files for later analysis and use. In an embodiment of the invention, for testing the service, the network administrator provides only specific information such as IP address and ports, and other information related to the data packets is provided in packet capture format. User input module 212 provides the information related to the data packets and the instruction to initiate the test to management application 208. In an embodiment of the invention user input module 212 also functions as a user output module. The user output module presents the XML response to the network administrator. The network administrator decides whether the service is working as intended on the basis of the XML response.

Management application 208 communicates with simulated interface 214, based on communication protocol 206. In a preferred embodiment of the invention, communication protocol 206 is an Extensible Markup Language (XML) format. The information related to the data packets is sent by management application 208 to simulated interface 214 in an XML file. The response generated from the test is received at management application 208 from simulated interface 214 in another XML file.

Simulated interface 214 controls the generating and forwarding of the data packet for further processing in network device 204. Simulated interface 214 creates a data packet, based on the instruction provided by management application 208, if the ingress interface is allowed for the source and the destination specified by the IP addresses. Further, simulated interface 214 injects the created data packet into network device 204 for further processing. Thereafter, simulated interface 214 receives the response for the injected data packet. Simulated interface 214 converts the response into XML format and sends it to management application 208 for further analysis and presentation. Routing control module 216 modifies routing and forwarding tables of network device 204 temporarily such that the response generated from the test is re-directed to simulated interface 214. Routing control module 216 resides in network device 204 but is transparent to NMS 202. Routing control module 216 may be Optimized Edge Routing (OER). The OER is a routing technique that allows the network administrator to guide their outbound traffic toward remote networks based on real-time measures of path performance, load, and cost. The OER allows the network administrator to select an outbound path from the available paths, based upon time delay, packet loss, reachability, use, load distribution, and transmit cost of a data packet. Network device 204 has a number of ports and interfaces where data packets enter and leave. Ingress interface 218 is an interface at which data packets enter network device 204 from network 100. Egress interface 220 is an interface where data packets leave network device 204 to the network 100.

Figure 3:
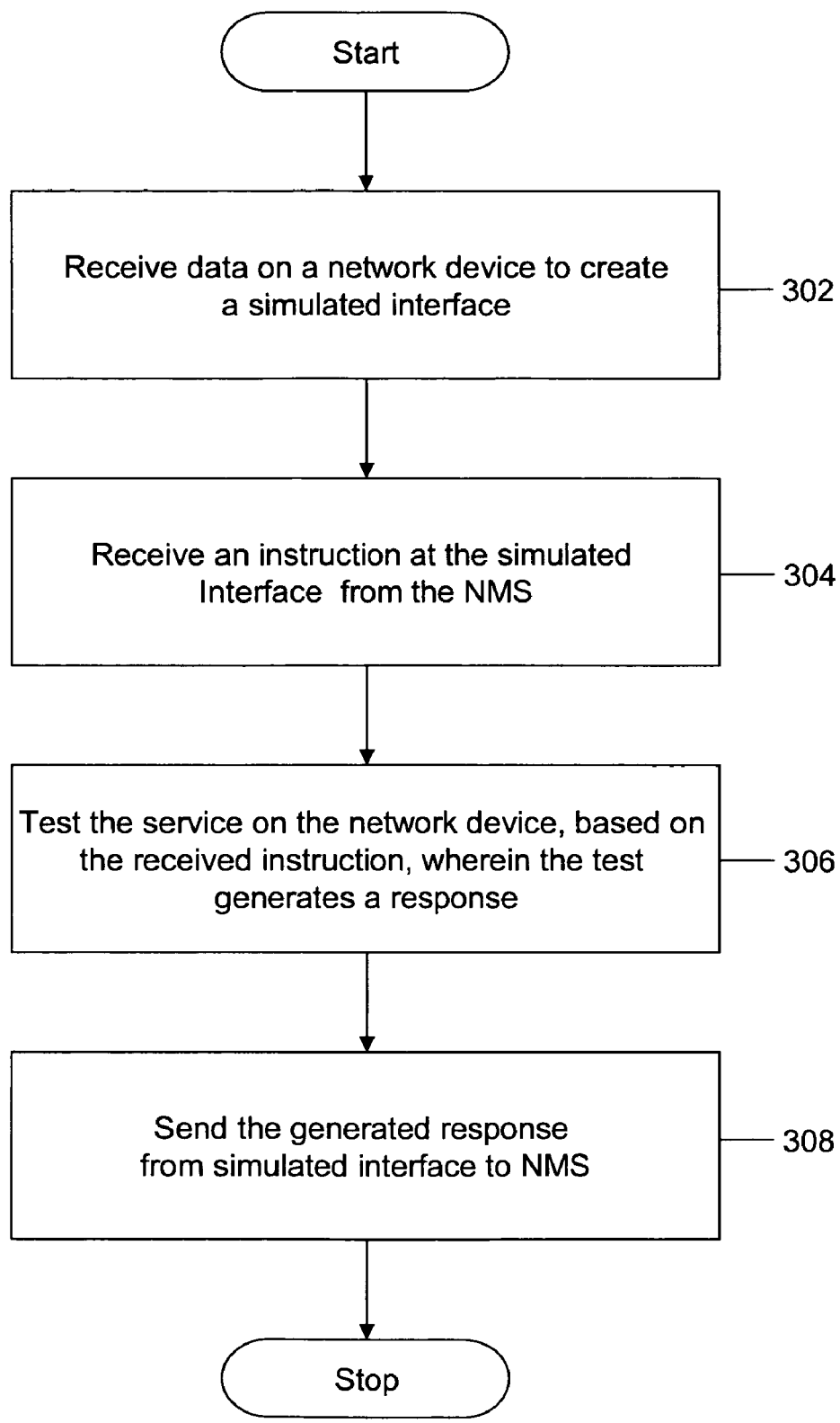
FIG. 3 is a flowchart, illustrating a method for testing a service in a network, in accordance with an exemplary embodiment of the invention.

FIG. 3 is a flowchart, illustrating a method for testing a service in a network, in accordance with an exemplary embodiment of the invention. At step 302, data is received from NMS 202 to create a simulated interface 214 on network device 204. The data is in the form of a message or instruction sent by simulation application 210 to instrument the intelligent code or simulated interface 214 on network device 204 At step 304, an instruction is received at simulated interface 214 from management application 208. The instruction comprises information related to a data packet. The information comprises data packet payload information, a source IP address, a destination IP address, and ingress interface for the data packet. In an embodiment of the present invention, the instruction comprises the data packet in a captured format such as packet capture format (pcap). At step 306, the service is tested on network device 204, based on the instruction. The service is tested by first temporarily modifying the routing and forwarding tables of network device 204 by routing control module 212, and then injecting the data packet into network device 204 by simulated interface 214. Thereafter, the injected data packet is processed by network device 204 and the response generated from the test is sent to simulated interface 214. The processing may comprise routing a data packet to another device, verifying a security policy compliance etc. At step 308, the response generated from the test is sent from simulated interface 214 to management application 208 in XML format. NMS 202 analyzes the response to decide whether the test was successful or more information needs to be retrieved for completing the test by injecting more packets into network device 204. If the test is not complete, then another instruction is sent by management application 208 to simulated interface 214. Thereafter, the response generated from the test is presented to the network administrator.

Figure 4A:
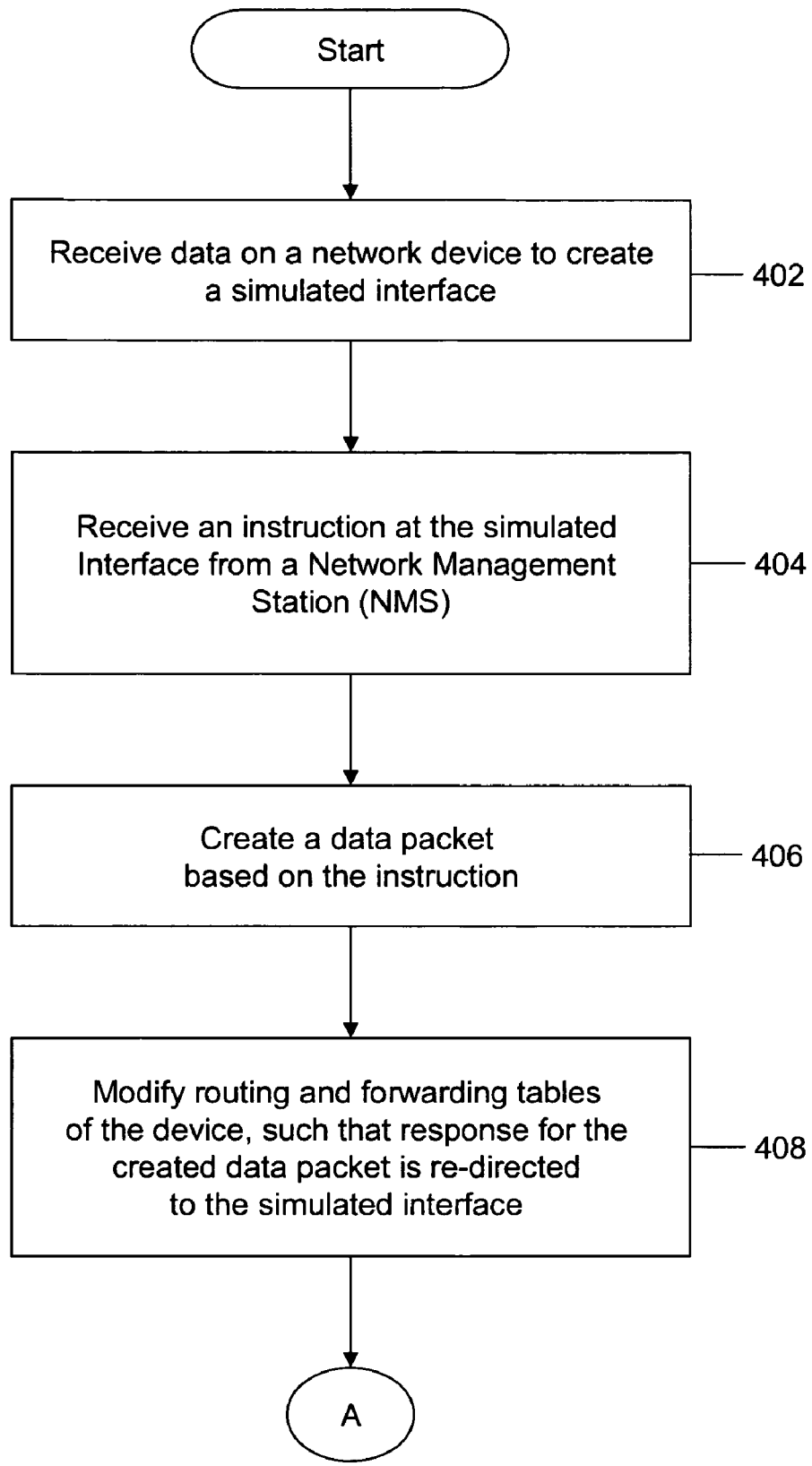
FIGS. 4a and 4b are flowcharts, illustrating a method for testing a service in a network, in accordance with another exemplary embodiment of the invention.
Figure 4B:
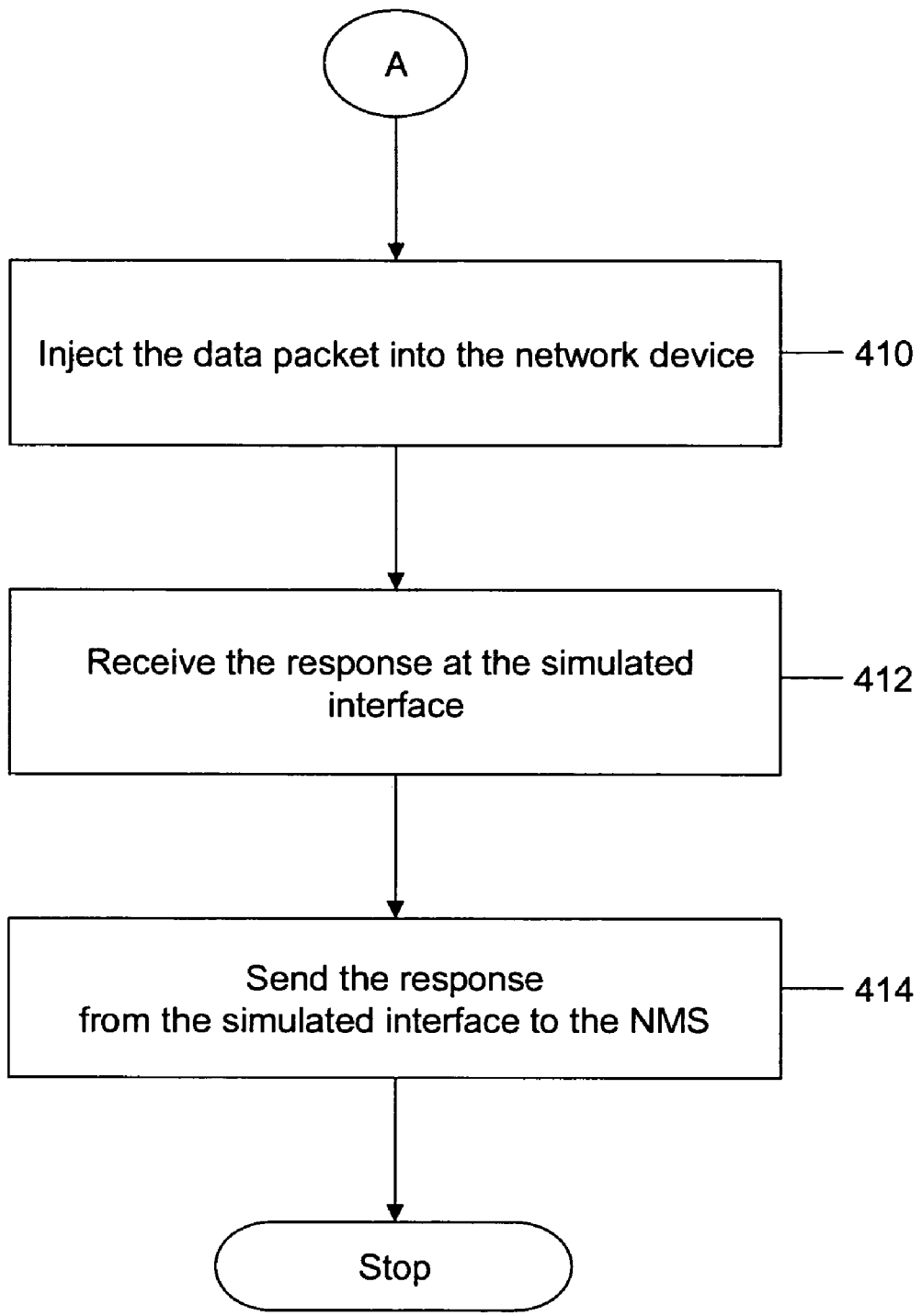

FIGS. 4a and 4b are flowcharts, illustrating a method for testing a service in a network, in accordance with another exemplary embodiment of the invention. At step 402, data is received from NMS 202 to create a simulated interface 214 on network device 204. At step 404, an instruction is received at simulated interface 214 from NMS 202. Management application 208 in NMS 202 sends the instruction. The instruction comprises information related to a data packet. The information related to the data packet comprises data packet payload information, source and destination IP addresses and ingress interface for the data packet. The instruction is based on a crypto Access Control List (ACL). An ACL is a list of individual filtering rules governing data packets or traffic in a network. The ACLs are used to provide security filtering and a generic data packet classification facility. They provide a means to filter data packets by allowing a user to permit or deny IP packets from crossing specified interfaces. Therefore, ACL is used to control the traffic or data packets provided by management application 208, by restricting the type of traffic that management application 208 deals with. Each individual filtering rule that is part of an ACL is termed an Access control element (ACE). A group of ACEs forms an ACL. Management application 208 creates an instruction for every ACE contained in the crypto ACL.

Additionally, the information related to the data packet comprises information to enable debug messages for specific features. The information enables some debug messages or log messages that are included in the response for the test. At step 406, the data packet is created by simulated interface 214 based on the instruction. Though the data packet is received from NMS 202, it appears to network device 204 that the data packet has a source given by the source IP address. Further, it appears to network device 204 that the data packet is being sent to the destination given by the destination IP address. At step 408, the routing and forwarding tables of network device 204 are modified by routing control module 212 in a manner that a response for the created data packet is re-directed to simulated interface 214. At step 410, the created packet is injected into network device 204 by simulated interface 214. The injected data packet is processed by network device 204. At step 412, the response for the injected data packet is received at simulated interface 214. The response for the injected data packet comprises one or more of the processed data packets, one or more log messages and one or more debug messages.

Moreover, the response for the injected data packet may comprise a generated data packet. The generated data packet is a data packet other than the processed data packet that originated during the test. An exemplary test has been described below, illustrating the origin of the generated data packet, which needs to be included in the response for the test. The network administrator of subnet 102 may want to test the VPN between subnets 102 and 104. The test is conducted on network device 108a as explained in conjunction with FIGS. 3 and 4. Network device 204 triggers IKE negotiations to set up the VPN. The Internet Key Exchange (IKE) is an Internet Protocol Security (IPSec) standard protocol used to ensure security for the VPN negotiation and remote network access. The IKE defines an automatic means of negotiation and authentication for IPSec Security Associations (SA). SA are security policies defined for communication between two or more entities. The entities may be different subnets. The IKE ensures security for SA communication without any pre-configuration. The IKE negotiations begin by transmitting data packets from network device 108a to network device 108b. A data packet of the IKE negotiations comprises a generated packet. Therefore, the generated packet is re-directed to simulated interface 214 instead of network device 108b. The generated packet is further provided to management application 208 in the response to the injected data packet, indicating that the IKE negotiations are taking place.

At step 414, the response for the injected data packet is sent from simulated interface 214 to management application 208 in XML format. Management application 208 analyzes the XML response and presents the analysis to the network administrator. NMS 202 analyzes whether the test was successful or more data packets are required to be injected into network device 204. Management application 208 can verify whether the service is working as intended by using the XML response and the related 'show' commands on network device 204. The 'show' commands on network device 204 provide information regarding the problems in service such as problems in routing, in VPN configuration, or at any remote end. In an embodiment of the invention, the XML response may directly be presented to NMS 202.

Management application 208 can build the required framework for testing various services like the VPN, firewalls and NAC in a secure environment. A trust mechanism between management application 208 and simulated interface 214 can be built by involving Public Key Infrastructure (PKI) certificates and Authentication, Authorization and Accounting (AAA) to avoid misuse of simulated interface 214. Additionally, traffic of the data packets on simulated interface 214 can be controlled, i.e. the data packets injected into and received from network device 204 per unit time can be controlled. And the communication between simulated interface 214 and management application 208 can be secured by using Secure HTTP (HTTPS).

According to various embodiments of the invention, a method for testing a service in a network is provided. The method comprises receiving data from a Network Management Station (NMS) to create a simulated interface on a network device; receiving an instruction at the simulated interface, wherein the instruction is received from the NMS, the instruction comprising a source address and a destination address; testing the service on the network device based on the received instruction, wherein the testing generates a response to indicate whether the service is working as intended, between the source address and the destination address; and sending the generated response from the simulated interface to the NMS.

In yet another embodiment of the invention, a method for testing a service in a network is provided. The method comprises sending a message to a network device to cause it to create a simulated interface; sending an instruction to the simulated interface to initiate a test, wherein the instruction comprises a source address and a destination address, the test comprising injecting a data packet into the network device to generate a response; and receiving the response generated from the test, wherein the response indicates whether the service is working as intended, between the source address and the destination address.

In various embodiments of the invention, a network system for testing a service in a network is provided. The network system comprises a network device, the network device comprising a simulated interface, the simulated interface conducting a test on the network device, wherein a response is generated from the test; and a routing control module, the routing control module modifying routing and forwarding tables of the network device.

In yet another embodiment of the invention, a system for testing a service in a network is provided. The network system comprises a Network Management Station (NMS), the NMS comprising means for sending a message to a network device to cause it to create a simulated interface; means for sending an instruction to the simulated interface to initiate a test; and means for receiving a response generated from the test.

In yet another embodiment, an apparatus for testing a service in a network is provided. The apparatus comprises a network device, the network device comprising means for creating a simulated interface on a network device in response to data received from a Network Management Station (NMS); means for receiving an instruction at the simulated interface, wherein the instruction is received from the NMS, the instruction comprising a source address and a destination address; means for testing the service on the network device based on the received instruction, wherein the testing generates a response to indicate if the service is working as intended, between the source address and the destination address; and means for sending the generated response from the simulated interface to the NMS.

In other embodiments, an apparatus for testing a service in a network is provided. The apparatus comprises a processor for executing instructions and a machine-readable medium that includes instructions executable by the processor. The instructions enable the apparatus to create a simulated interface in response to data received from a Network Management Station (NMS). The instructions further enable the apparatus to receive an instruction at the simulated interface, wherein the instruction is received from the NMS. The instruction comprises a source address and a destination address. The instructions further enable the apparatus to test the service on the network device based on the received instruction, wherein the testing generates a response to indicate whether the service is working as intended, between the source address and the destination address; and to send the generated response from the simulated interface to the NMS.

Embodiments of the invention provide an advantage of testing a provisioned service in a network at a facility within the network. An NMS application sends probe to network devices for service/feature provisioning verification, penetration testing, monitoring and trouble shooting without having testing gears at remote facilities. Embodiments of the invention provide another advantage of a mechanism on a network device to inject data packets with arbitrary source and destination address from outside to serve as a tool for testing the changes in network configuration.

Embodiments of the invention provide yet another advantage of eliminating packet generators or physical end points for testing.

Embodiments of the invention have an advantage of saving time and effort to test the provisioned services, as it does not depend on the generation of real packets.

Embodiments of the invention have another advantage of testing the impact on security attacks like malicious packets destined to the network device. Further, embodiments of the invention provide an advantage that the management framework can use the run-time state of the system to inject packets for testing. The information captured earlier can be used for re-injecting packets required for testing.

Embodiments of the invention provide yet another advantage that regular monitoring of services can be achieved with this mechanism by generating testing packets periodically.

Embodiments of the invention additionally provide the advantage that this mechanism can be used during the development of network devices without requiring real networks to be set up as packets can be injected through the simulated interface.

Although the invention has been discussed with respect to specific embodiments thereof, these embodiments are merely illustrative, and not restrictive, of the invention.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain and store the computer program for use by or in connection with the instruction execution system apparatus, system or device. The computer readable medium can be, by way of example only but not by limitation a semiconductor system, apparatus, system, device or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/figures should be considered only as exemplary, and not limiting, unless otherwise specifically rioted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for testing a service in a network, the method comprising:

receiving data from a Network Management Station (NMS) to create a simulated interface on a network device;

receiving an instruction at the simulated interface, wherein the instruction is received from the NMS, the instruction comprising a source address and a destination address, information related to a data packet, and wherein the information related to the data packet comprises at least one of the data packet payload information and an ingress interface for the data packet;

testing the service on the network device based on the received instruction, wherein the simulated interface generates a response to indicate whether configuration commands associated with the service are working as intended between the source address and the destination address, and wherein the testing of the service comprises creating a data packet based on the instruction, if the ingress interface for the data packet is allowed for the source address and the destination address;

modifying routing and forwarding tables at the network device, such that a response for the created data packet is re-directed to the simulated interface;

injecting the created data packet into the network device by the simulated interface, wherein the network device processes the injected data packet to generate the response;

receiving the response at the simulated interface, wherein the response comprises a processed data packet; and sending the generated response from the simulated interface to the NMS.

2. The method of claim 1, wherein the data packet is an Internet Protocol (IP) packet.

3. The method of claim 1, wherein the instruction comprises the data packet in packet capture format.

4. The method of claim 1, wherein the response for the created data packet comprises a data packet other than the processed data packet, generated from the test.

5. The method of claim 1, further comprising storing at least one of the data packet payload information, the source address, the destination address, and the ingress interface for the data packet in a memory, such that stored information is available for comparison with the generated response.

6. The method of claim 1, wherein flow of one or more data packets injected into the network device by the simulated interface can be controlled based on data packets per unit time.

7. The method of claim 1, wherein the instruction is in XML format.

8. The method of claim 1, wherein communication at the simulated interface is secured using at least one of Public Key Infrastructure (PKI) and Authentication, Authorization and Accounting (AAA).

9. A method for testing a service in a network, the method comprising:
   sending a message to a network device to cause it to create a simulated interface on a network device;
   sending an instruction to the simulated interface to initiate a test, wherein the instruction comprises a source address and a destination address, information related to a data packet, and wherein the information related to the data packet comprises at least one of the data packet payload information and an ingress interface for the data packet, the test comprising injecting a data packet into the network device to generate a response, the test further comprising creating a data packet based on the instruction, if the ingress interface for the data packet is allowed for the source address and the destination address;
   modifying routing and forwarding tables at the network device, such that a response for the created data packet is re-directed to the simulated interface;
   injecting the created data packet into the network device by the simulated interface, wherein the network device processes the injected data packet to generate the response;
   receiving the response at the simulated interface, wherein the response comprises a processed data packet; and
   receiving the response generated by the simulated interface, wherein the response indicates whether configuration commands associated with the service are working as intended, between the source address and the destination address.

10. The method of claim 9 further comprising receiving an input, the input containing information related to one or more data packets.

11. The method of claim 10 further comprising receiving the input from a network administrator at a user interface.

12. The method of claim 10 further comprising receiving the input in packet capture format.

13. The method of claim 10, wherein the information related to the one or more data packets comprises indicating whether to generate a data packet other than the injected data packet.

14. The method of claim 9 further comprising analyzing the response generated from the test to decide whether another instruction is required to be sent, wherein the another instruction is required if the test is not successful.

15. A network system for testing a service in a network, the network system comprising:
   a Network Management Station (NMS), the NMS comprising:
   means for sending a message to a network device to cause it to create a simulated interface on the network device;
   means for sending an instruction to the simulated interface to initiate a test, wherein the instruction is received from the NMS, the instruction comprising a source address and a destination address, information related to a data packet, and wherein the information related to the data packet comprises at least one of the data packet payload information and an ingress interface for the data packet, wherein the simulated interface generates a response to indicate whether configuration commands associated with the service are working as intended between the source address and the destination address, and wherein the test comprises creating a data packet based on the instruction, if the ingress interface for the data packet is allowed for the source address and the destination address;
   modifying routing and forwarding tables at the network device, such that a response for the created data packet is re-directed to the simulated interface;
   injecting the created data packet into the network device by the simulated interface, wherein the network device processes the injected data packet to generate the response;
   receiving the response at the simulated interface, wherein the response comprises a processed data packet; and
   means for receiving a response generated from the test.

16. A network system for testing a service in a network, the network system comprising:
   a network device, the network device comprising:
   means for creating a simulated interface on a network device in response to data received from a Network Management Station (NMS);
   means for receiving an instruction at the simulated interface, wherein the instruction is received from the NMS, the instruction comprising a source address and a destination address, information related to a data packet, and wherein the information related to the data packet comprises at least one of the data packet payload information and an ingress interface for the data packet;
   means for testing the service on the network device based on the received instruction, wherein the simulated interface generates a response to indicate whether configuration commands associated with the service are working as intended between the source address and the destination address, and wherein the testing of the service comprises creating a data packet based on the instruction, if the ingress interface for the data packet is allowed for the source address and the destination address;
   modifying routing and forwarding tables at the network device, such that a response for the created data packet is re-directed to the simulated interface;
   injecting the created data packet into the network device by the simulated interface, wherein the network device processes the injectable data packet to generate the response;
   receiving the response at the simulated interface, wherein the response comprises a processed data packet; and
   means for sending the generated response from the simulated interface to the NMS.

17. An apparatus for testing a service in a network, the apparatus comprising:
   a processing system including a processor;

a machine-readable medium including instructions executable by the processor comprising:

means for creating a simulated interface on a network device in response to data received from a Network Management Station (NMS);

means for receiving an instruction at the simulated interface, wherein the instruction is received from the NMS, the instruction comprising a source address and a destination address, information related to a data packet, and wherein the information related to the data packet comprises at least one of the data packet payload information and an ingress interface for the data packet;

means for testing the service on the network device based on the received instruction, wherein the simulated interface generates a response to indicate whether configuration commands associated with the service are working as intended between the source address and the destination address, and wherein the testing of the service comprises creating a data packet based on the instruction, if the ingress interface for the data packet is allowed for the source address and the destination address;

modifying routing and forwarding tables at the network device, such that a response for the created data packet is re-directed to the simulated interface;

injecting the created data packet into the network device by the simulated interface, wherein the network device processes the injected data packet to generate the response;

receiving the response at the simulated interface, wherein the response comprises a processed data packet; and means for sending the generated response from the simulated interface to the NMS.

* * * * *